United States Patent Office 3,327,091
Patented June 20, 1967

3,327,091
ALUMINUM BRONZE WELDING ELECTRODE
Charles E. Rogers, Bayside, and Joseph F. Quaas, Island Park, N.Y., assignors to Eutectic Welding Alloys Corporation, Flushing, N.Y., a corporation of New York
No Drawing. Filed Nov. 19, 1963, Ser. No. 324,818
2 Claims. (Cl. 219—146)

This invention relates to an aluminum bronze electrode for automatic or semi-automatic applications, and it more particularly relates to a tubular form of such an electrode.

An object of this invention is to provide an aluminum bronze electrode that applies tough and ductile aluminum bronze deposits under open arc conditions.

In accordance with this invention an aluminum bronze electrode includes a copper tube and a filler of the following constituents in the indicated ranges of percentages by weight.

| Constituents: | Percent by weight |
|---|---|
| Aluminum | 14 to 18 |
| Iron | 2 to 6 |
| Copper | 13.4 to 4.7 |
| Cryolite | 0.2 to 0.5 |
| Silicon dioxide | 0.4 to 0.8 |

The following constitutents in the indicated ranges of percentages by weight provide a preferred form of this invention.

| Constituents: | Percent by weight |
|---|---|
| Aluminum | 14.5 to 16.0 |
| Iron | 3.0 to 4.0 |
| Copper | 11.85 to 8.95 |
| Cryolite | 0.35 to 0.45 |
| Silicon dioxide | 0.50 to 0.60 |

The tube is conveniently made from soft copper strip which is formed into a tube. The aforementioned composition is conveniently added during the tube forming process and sealed into it. The resulant electrode is pliable and is drawn to a uniform diameter. It is therefore readily fed through automatic or semi-automatic wire feeders without the difficulties from those properties encountered with wrought aluminum bronze wires. The electrode of this invention may be applied efficiently with open or bare arc processes requiring no flux other than that contained within the tube. However it might also be employed with a submerging flux if desired. The electrode of this invention may also be cut into short strips and used with additional flux applied to its outer surface.

A preferred example of the filler of this invention includes the following constituents in the indicated percentages by weight.

| Constituents: | Percent by weight |
|---|---|
| Aluminum | 15.0 |
| Iron | 3.5 |
| Copper | 10.5 |
| Cryolite | 0.40 |
| Silicon dioxide | 0.60 |
| Copper tube | 70.0 |

What is claimed is:

1. A tubular aluminum bronze electrode consisting essentially of a copper tube and a filler of the following constituents in the indicated ranges of percentages by weight of the overall electrode with the balance being said copper tube:

| Constituents: | Percent by weight |
|---|---|
| Aluminum | 14 to 18 |
| Iron | 2 to 6 |
| Copper | 13.4 to 4.7 |
| Cryolite | 0.2 to 0.5 |
| Silicon dioxide | 0.4 to 0.8 |

2. A tubular aluminum bronze electrode consisting essentially of a copper tube and a filler of the following constituents in the indicated ranges of percentages by weight of the overall electrode with the balance being said copper tube:

| Constituents: | Percent by weight |
|---|---|
| Aluminum | 14.5 to 16.0 |
| Iron | 3.0 to 4.0 |
| Copper | 11.85 to 8.95 |
| Cryolite | 0.35 to 0.45 |
| Silicon dioxide | 0.50 to 0.60 |

References Cited

UNITED STATES PATENTS

| 1,531,827 | 3/1925 | Armor | 219—146 |
| 1,650,905 | 11/1927 | Mills | 219—146 |
| 2,320,676 | 6/1943 | Swift | 219—146 |
| 2,435,198 | 2/1948 | Browne | 219—146 |

RICHARD M. WOOD, *Primary Examiner.*

B. A. STEIN, *Assistant Examiner.*